(12) United States Patent
Hosotani et al.

(10) Patent No.: US 7,113,411 B2
(45) Date of Patent: Sep. 26, 2006

(54) SWITCHING POWER SUPPLY

(75) Inventors: Tatsuya Hosotani, Muko (JP); Hiroshi Takemura, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 81 days.

(21) Appl. No.: 10/541,521

(22) PCT Filed: Oct. 29, 2004

(86) PCT No.: PCT/JP2004/016103

§ 371 (c)(1),
(2), (4) Date: Jul. 7, 2005

(87) PCT Pub. No.: WO2005/074113

PCT Pub. Date: Aug. 11, 2005

(65) Prior Publication Data

US 2006/0062024 A1 Mar. 23, 2006

(30) Foreign Application Priority Data

Jan. 30, 2004 (JP) .............................. 2004-024563

(51) Int. Cl.
*H02M 3/335* (2006.01)
*H02M 7/537* (2006.01)
(52) U.S. Cl. ...................... 363/16; 363/21.12; 363/131
(58) Field of Classification Search ................. 363/15, 363/16, 20, 21.1, 21.12, 21.16, 95, 97, 123, 363/131
See application file for complete search history.

(56) References Cited

U.S. PATENT DOCUMENTS

| | | | | |
|---|---|---|---|---|
| 5,862,043 A | * | 1/1999 | Youn et al. | 363/21.04 |
| 6,018,467 A | * | 1/2000 | Majid et al. | 363/16 |
| 6,469,913 B1 | * | 10/2002 | Hosotani et al. | 363/16 |
| 6,717,827 B1 | * | 4/2004 | Ota | 363/21.12 |

FOREIGN PATENT DOCUMENTS

| | | |
|---|---|---|
| JP | 04-021358 | 1/1992 |
| JP | 06-169569 | 6/1994 |
| JP | 07-075334 | 3/1995 |
| JP | 07-264860 | 10/1995 |
| JP | 11-187664 | 7/1999 |
| JP | 2003-224972 | 8/2003 |

* cited by examiner

*Primary Examiner*—Adolf Berhane
(74) *Attorney, Agent, or Firm*—Keating & Bennett, LLP

(57) ABSTRACT

A switching power supply apparatus includes first and second switch circuits (S1) and (S2) including switch devices (Q1) and (Q2), diodes (D1) and (D2), and capacitors (Cds1) and (Cds2), and a transformer (T). A first inductor (Lr) is connected in series with a primary winding (Lp) of the transformer (T), and a second inductor (Li) is arranged so that a voltage of a third capacitor (Ca) is applied during an on-period of the first switch circuit (S1). A diode (Di) preventing a reverse current from flowing in the second inductor (Li), and a capacitor (Ci) that is charged by excitation energy stored in the second inductor (Li) and that applies a voltage to the primary winding (Lp) during the on-period of the first switch circuit (S1) are further provided. A capacitor (Cr) is further provided so as to define a closed loop together with the inductor (Lr), the primary winding (Lp), and the second switch circuit (S2).

36 Claims, 7 Drawing Sheets

SWITCHING POWER SUPPLY

BACKGROUND OF THE INVENTION

1. Field of the Invention

The present invention relates to a switching power supply apparatus that performs intermittent power supply from an input power supply and that performs power conversion using an inductor to output a predetermined DC voltage.

2. Description of the Related Art

In general, performance measures of switching power supply apparatuses include a harmonic characteristic and a power factor characteristic. The harmonic characteristic is a function for suppressing a harmonic current flowing from a switching power supply apparatus to an input power supply line thereof, and the upper limit of the harmonic current is defined so as not to affect other components. The power factor characteristic is the power factor viewed at the input from the switching power supply apparatus. In order to reduce the loss of the power system, the higher the power factor, the better.

In the related art, therefore, switching power supply apparatuses having the structure disclosed in Patent Documents 1 to 3 have been devised.

The structure of the switching power supply apparatus disclosed in Patent Document 1 is shown in FIG. 13. In FIG. 13, a first switch circuit S1 is composed of a parallel circuit including a first switch device Q1, a first diode D1, and a first capacitor C1, and a second switch circuit S2 is composed of a parallel circuit including a second switch device Q2, a second diode D2, and a second capacitor C2.

Symbol T indicates a transformer. The first switch circuit S1 and an input power supply E are connected in series with a series circuit including a primary winding T1 of the transformer T and an inductor L. A series circuit including the second switch circuit S2 and a capacitor C is connected in parallel to the series circuit including the primary winding T1 and the inductor L. A secondary winding T2 of the transformer T is provided with a rectifying and smoothing circuit including a rectifying diode Ds and a smoothing capacitor Co. A capacitor Cs is connected in parallel to the rectifying diode Ds on the secondary side. A detection circuit 14 detects an output voltage Vo supplied to a load and, if necessary, an output current Io. A control circuit 11 receives a voltage generated in a bias winding T3, and causes the switch device Q1 to be self-excitation oscillated by applying positive feedback. A control circuit 12 receives a voltage generated in a bias winding T4, and controls the on-period of the switch device Q2 by controlling the turn-off timing of the switch device Q2.

The structure of the switching power supply apparatus disclosed in Patent Document 2 is shown in FIG. 14. In FIG. 14, an AC voltage supplied from an AC power supply 2 is rectified by a rectifier 4 and is then smoothed by a smoothing capacitor 6 to obtain a rectified voltage Vin, and the rectified voltage Vin is supplied to a first power converter 8 and a second power converter 10. When a switching transistor Qs is turned on, the rectified voltage Vin is applied to a choke coil CH, a diode Db, and a primary winding L1 of a high-frequency transformer T, and energy is stored in the choke coil CH. When the switching transistor Qs is turned off, the energy in the choke coil CH causes a current to flow through a diode Dc, the primary winding L1, and a capacitor C1. This on/off operation of the switching transistor Qs is repeatedly performed so that a voltage induced in a secondary winding L2 of the transformer T is smoothed by a diode D2 and a capacitor Co and a DC voltage Vo is output. A pulse width control circuit 16 controls the conduction time of the switching transistor Qs depending upon fluctuations in the output voltage Vo to stabilize the voltage Vo.

An example structure of the switching power supply apparatus disclosed in Patent Document 3 is shown in FIG. 15. In FIG. 15, a full-wave rectifying circuit 2 receives an AC input voltage from an input terminal 1–1' and outputs a rectified voltage Ei. A first capacitor 3 smoothes a current of an inductor 20 via a second switching device 6 and a second capacitor 7, and supplies a DC voltage E3. A first switching device 4 converts the rectified voltage Ei via the inductor 20 and also the DC voltage E3 of the first capacitor 3 via a primary winding 51 of a transformer 5 into AC voltages by high-frequency switching. The second switching device 6 and the first switching device 4 are alternately turned on and off by a control circuit 11. The second capacitor 7 absorbs and emits a portion of the excitation energy stored in the transformer 5 and the current of the inductor 20 during the on-time of the second switching device 6. A rectifying and smoothing circuit composed of a diode 8 and a capacitor 9 rectifies and smoothes a flyback voltage of a high-frequency AC voltage generated in a secondary winding 52, and outputs a DC output voltage Eo to an output terminal 10–10'. The control driving circuit 11 detects the DC output voltage Eo, and controls the on-off ratio of the first switching device 4 and the second switching device 6.

Patent Document 1: Japanese Unexamined Patent Application Publication No. 11-187664

Patent Document 2: Japanese Unexamined Patent Application Publication No. 4-21358

Patent Document 3: Japanese Unexamined Patent Application Publication No. 7-75334

In Patent Document 1, although a zero voltage switching operation (hereinafter referred to as a "ZVS operation") performed by a voltage clamping circuit provides high efficiency, there is no function for harmonic current suppression.

In Patent Document 2, although there is a function for harmonic current suppression, a ZVS operation is not performed, leading to high switching loss and hence low circuit efficiency.

In Patent Document 3, although a ZVS operation is performed by a voltage clamping circuit and there is a function for harmonic current suppression, the current generated by a switching operation flows in the diode for rectifying the commercial AC voltage (the full-wave rectifying circuit 2 shown in FIG. 15), leading to large loss in this diode and a low harmonic current reduction effect. It is therefore necessary to provide a low-pass filter on the commercial AC power supply line, thereby increasing the size of the switching power supply apparatus. Another problem is that a voltage of the capacitor 3 for ensuring the duration (the output holding time) for which the output can continuously be supplied even when the commercial AC power supply is temporarily shut down due to instantaneous power failure or the like is not controlled, and therefore, the voltage greatly increases under a light load, which may cause the voltage to exceed the breakdown voltage of the parts.

SUMMARY OF THE INVENTION

In order to overcome the problems described above, preferred embodiments of the present invention provide a switching power supply apparatus with a high harmonic current reduction effect, with improved harmonic characteristic and power factor characteristic, and with higher efficiency.

A switching power supply apparatus according to a preferred embodiment of the present invention includes a first switch circuit S1 including a parallel circuit having a first switch device Q1, a first diode D1, and a first capacitor Cds1, a second switch circuit S2 including a parallel connection circuit having a second switch device Q2, a second diode D2, and a second capacitor Cds2, an input-side rectifying circuit Da including at least one rectifying device for rectifying an AC input voltage, a third capacitor Ca to which the voltage rectified by the rectifying circuit Da is applied, a transformer T having a primary winding Lp and a secondary winding Ls, a rectifying and smoothing circuit RS connected to the secondary winding Ls, a first inductor Lr connected in series with the primary winding Lp, a second inductor Li connected so that a voltage of the third capacitor Ca is applied during an on-period for which the first switch circuit S1 conducts, a third diode Di preventing a reverse current from flowing in the second inductor Li, a fourth capacitor Ci that is charged by excitation energy stored in the second inductor Li and that is connected so as to apply a voltage to the primary winding Lp during the on-period of the first switch circuit S1, a fifth capacitor Cr defining a closed loop together with the first inductor Lr, the primary winding Lp, and the second switch circuit S2, and switching control circuits SC1 and SC2 for alternately turning on and off the first and second switch devices with a period of time during which both switch devices are turned off therebetween.

A switching power supply apparatus according to another preferred embodiment of the present invention includes a first switch circuit S1 including a parallel connection circuit having a first switch device Q1, a first diode D1, and a first capacitor Cds1, a second switch circuit S2 including a parallel connection circuit having a second switch device Q2, a second diode D2, and a second capacitor Cds2, an input-side rectifying circuit Da including at least one rectifying device for rectifying an AC input voltage, a third capacitor Ca to which the voltage rectified by the rectifying circuit Da is applied, a transformer T having a primary winding Lp and a secondary winding Ls, a rectifying and smoothing circuit RS connected to the secondary winding Ls, a first inductor Lr connected in series with the primary winding Lp, a second inductor Li connected so that a voltage of the third capacitor Ca is applied during an on-period for which the first switch circuit S1 conducts, a third diode Di preventing a reverse current from flowing in the second inductor Li, a fourth capacitor Ci that is charged by excitation energy stored in the second inductor Li and that is connected so as to apply a voltage to the primary winding Lp during the on-period, a fifth capacitor Cr forming, together with the second switch circuit S2, a series circuit connected to both ends of the first switch circuit S1, and switching control circuits SC1 and SC2 for alternately turning on and off the first and second switch devices with a period of time during which both switch devices are turned off therebetween.

The switching power supply apparatus may preferably include a second transformer T2 that is different from the transformer T, and the second inductor Li may include an input winding of the second transformer T2, and a rectifying circuit Ds2 may be provided between an output winding Lo of the second transformer T2 and the rectifying and smoothing circuit RS.

The switching power supply apparatus may preferably include a second transformer T2 that is different from the transformer T, an input winding Li1 of the second transformer T2 may be connected in series with the second inductor Li, and a rectifying circuit may be provided between the output winding of the second transformer T2 and the rectifying and smoothing circuit.

The switching power supply apparatus may be arranged such that the transformer T has a tertiary winding Lt, and the tertiary winding Lt is connected in series with the second inductor Li.

The switching power supply apparatus may be arranged such that the third capacitor Ca defines a low-pass filter blocking a harmonic component current or a portion of the low-pass filter.

The switching power supply apparatus may include a fourth diode Db connected between the input-side rectifying circuit Da and the fourth capacitor Ci.

The switching power supply apparatus may be arranged such that one end of the second inductor Li is connected to a node between the first switch circuit S1 and the second switch circuit S2 and the other end is connected to the third diode Di, and both ends of the fourth diode Dc are connected to a node between the second switch circuit S2 and the fifth capacitor Cr and the node between the first switch circuit S1 and the second switch circuit S2.

The switching power supply apparatus may be arranged such that the transformer T includes one or a plurality of drive windings Lb1 and Lb2, and the switching control circuits SC1 and SC2 drive the first switch device Q1 or the second switch device Q2 using a voltage generated in the drive windings Lb1 and Lb2.

The switching power supply apparatus may further include delay circuits DL1 and DL2 including series circuits having resistors Rg1 and Rg2 and capacitors Cg1 and Cg2 which are provided between the drive windings Lb1 and Lb2 and control terminals of the first and second switching devices Q1 and Q2, and the switching control circuits SC1 and SC2 may be arranged to turn on the switch devices Q1 and Q2 with a delay after voltages for turning on the switch devices Q1 and Q2 are generated in the drive windings Lb1 and Lb2.

The switching power supply apparatus may be arranged such that delay times of the delay circuits DL1 and DL2 are set so that the switch devices Q1 and Q2 are not turned on until the voltages to be applied to both ends of the first and second switch devices Q1 and Q2 are reduced to zero or about zero.

The switching power supply apparatus may be arranged such that the switching control circuits SC1 and SC2 are turned on a predetermined time after voltages for turning on the switch devices Q1 and Q2 are generated in the drive windings Lb1 and Lb2, thereby turning off the switch devices Q1 and Q2.

The switching power supply apparatus may be arranged such that a switch includes transistors Tr1 and Tr2, and an impedance circuit and capacitors Ct1 and Ct2 defining time constant circuits are connected to control terminals of the transistors Tr1 and Tr2, respectively.

The switching power supply apparatus may be arranged such that the switching control circuits SC1 and SC2 include time constant circuits TC1 and TC2 for turning off the switch devices Q1 and Q2 a certain time after voltages for turning on the switch devices Q1 and Q2 are generated in the drive windings Lb1 and Lb2.

The switching power supply apparatus may be arranged such that the transformer T has a leakage inductance and the leakage inductance is configured as the first inductor Lr.

The switching power supply apparatus may be constructed such that at least one of the first switch circuit S1 and the second switch circuit S2 includes a field-effect transistor.

The switching power supply apparatus may be arranged such that the switching control circuits SC1 and SC2 control the on-period of the first switch device Q1 so as to stabilize an output voltage obtained from the rectifying and smoothing circuit RS connected to the secondary winding Ls.

The switching power supply apparatus may be arranged such that the switching control circuits SC1 and SC2 control the on-period of the second switch device Q2 depending upon the voltage across the fourth capacitor Ci.

The switching power supply apparatus may be arranged such that the switching control circuits SC1 and SC2 suppress the on-period of the second switch device Q2 as the voltage across the fourth capacitor Ci increases, and transitioning to an intermittent oscillation operation mode in which an oscillation period and a stop period are periodically repeated under a light load or no load, the switching control circuits SC1 and SC2 suppress an increase of the voltage across the fourth capacitor Ci.

According to various preferred embodiments of the present invention, the first switch device Q1 and the second switch device Q2 have extremely low switching loss by performing a zero voltage switching operation. Moreover, an input half-wave rectified voltage or full-wave rectified voltage is switched, and a current proportional to the rectified voltage is caused to flow. Thus, the current exhibits a sine-wave peak value, leading to high power factor. The third diode Di preventing a reverse current from flowing in the second inductor Li does not need to rectify both the commercial AC voltage and the switching current, which is shown in Patent Document 3, but may rectify only the switching current. Thus, low loss can be achieved with high-speed switching. Furthermore, in the input-side rectifying circuit Da, a high-frequency current does not flow in a diode for rectifying the commercial AC voltage, which is shown in Patent Document 3. Thus, harmonic current suppression is not reduced.

According to preferred embodiments of the present invention, the fifth capacitor Cr defining a series circuit connected to both ends of the first switch circuit S1 together with the second switch circuit S2, and the switching control circuits SC1 and SC2 that alternately turn on and off the first and second switch devices, with a period of time during which the first and second switch devices are turned off therebetween, are provided. Thus, by increasing the applied voltage of the fifth capacitor Cr, the capacitance of the fifth capacitor Cr can be reduced.

According to preferred embodiments of the present invention, the input winding of the second transformer T2 serves as the second inductor Li, and the output winding of the second transformer T2 is connected to the rectifying and smoothing circuit via the rectifying circuit. Thus, the energy stored in the input winding of the second transformer T2 can directly be supplied to the secondary side by the second transformer T2, and the current of the transformer T decreases, leading to low conduction loss and high efficiency.

According to preferred embodiments of the present invention, the input winding Li1 of the second transformer T2 is connected in series with the second inductor Li, and the output winding of the second transformer T2 and the rectifying circuit are connected via another rectifying circuit. Thus, the voltage applied to the second inductor Li can be adjusted to widen the input current conduction angle, thereby further suppressing the harmonic current or, conversely, to narrow the conduction angle, thereby preventing the voltage of the capacitor Ci from increasing.

According to preferred embodiments of the present invention, the tertiary winding Lt of the transformer T is connected in series with the second inductor Li. Thus, the voltage applied to the second inductor Li can be adjusted to widen the input current conduction angle, thereby further suppressing the harmonic current or, conversely, to narrow the conduction angle, thereby preventing the voltage of the capacitor Ci from increasing.

According to preferred embodiments of the present invention, the third capacitor Ca prevents a high-frequency current from propagating to the input power supply line side due to the switching of the first and second switch devices Q1 and Q2. Thus, a high harmonic current suppression effect is achieved.

According to preferred embodiments of the present invention, the fourth diode Db connected between the input-side rectifying circuit Da and the fourth capacitor Ci allows the fourth capacitor Ci to be directly charged when the apparatus is powered on, and prevents the magnetic deviation phenomenon of the transformer, etc., until it reaches the steady state.

According to preferred embodiments of the present invention, the second inductor Li is short-circuited by the fourth diode Dc and the second switch circuit S2 during the off-period of the first switch circuit S1. Thus, the current flowing in the inductor Li becomes zero, and the voltage applied to the third diode Di can be greatly reduced. A low-breakdown-voltage diode may therefore be used as the third diode Di.

According to preferred embodiments of the present invention, the transformer T has the drive windings Lb1 and Lb2, and voltages generated in the drive windings Lb1 and Lb2 are used to drive the first and second switch devices Q1 and Q2. Thus, self-excited oscillation can be performed.

According to preferred embodiments of the present invention, the delay circuits DL1 and DL2 are provided, and the switch devices Q1 and Q2 are turned on with a delay after voltages for turning on the switch devices Q1 and Q2 are generated in the drive windings Lb1 and Lb2, thus producing a dead time. The first and second switch devices Q1 and Q2 can therefore alternately be turned on and off at an appropriate timing.

According to preferred embodiments of the present invention, the delay times of the delay circuits DL1 and DL2 are preferably set so that the first and second switch devices Q1 and Q2 are not turned on until the voltages to be applied to both ends of the first and second switch devices Q1 and Q2 are reduced to zero or about zero. A zero voltage switching operation is therefore performed, leading to low switching loss and high efficiency.

According to preferred embodiments of the present invention, the switching control circuits SC1 and SC2 include a switch arranged to turn off the switch devices Q1 and Q2. Thus, the switching control circuits SC1 and SC2 have a simple structure, and switching control can be performed with a small number of parts.

According to preferred embodiments of the present invention, the switch includes transistors Tr1 and Tr2, and time constant circuits are provided. Thus, the on-period of the first and second switch devices Q1 and Q2 can easily be set.

According to preferred embodiments of the present invention, the time constant circuits TC1 and TC2 allow the switch devices Q1 and Q2 to be turned off a predetermined time after voltages for turning on the switch devices Q1 and Q2 are generated in the drive windings Lb1 and Lb2. Thus, the turn-off timing can be appropriately set to determine the on-period of the switch devices Q1 and Q2.

According to preferred embodiments of the present invention, the leakage inductance of the transformer T is preferably used as the first inductor Lr. Thus, the number of parts can be reduced.

According to preferred embodiments of the present invention, at least one of the first switch circuit S1 and the second switch circuit S2 includes a field-effect transistor. Thus, the diodes D1 and D2 can include parasitic diodes, and the capacitors Cds1 and Cds2 can include parasitic capacitors. A parallel connection circuit including the switch devices Q1 and Q2, the diodes D1 and D2, and the capacitors Cds1 and Cds2 can therefore be configured with a small number of parts.

According to preferred embodiments of the present invention, the output voltage is stabilized by controlling the on-period of the first switch device Q1. Thus, a constant-voltage power supply apparatus can be realized.

According to preferred embodiments of the present invention, the on-period of the second switch device Q2 is controlled depending upon the voltage across the fourth capacitor Ci. Thus, a constant-voltage power supply apparatus can be realized.

According to preferred embodiments of the present invention, the switching control circuits SC1 and SC2 suppress the on-period of the second switch device Q2 as the voltage across the fourth capacitor Ci increases, and, transitioning to the intermittent oscillation operation mode under a light load or no load, the switching control circuits SC1 and SC2 suppress an increase of the voltage across the fourth capacitor Ci. Thus, the fourth capacitor Ci can be prevented from being damaged and the breakdown voltage thereof can be reduced. The breakdown voltage of the switch devices Q1 and Q2 and the rectifying diode Ds on the secondary side can also be reduced.

Other features, elements, characteristics and advantages of the present invention will become more apparent from the following detailed description of preferred embodiments with reference to the attached drawings.

DETAILED DESCRIPTION OF PREFERRED EMBODIMENTS

A switching power supply apparatus according to a first preferred embodiment of the present invention will be described with reference to FIGS. 1 to 3.

Figure 1:
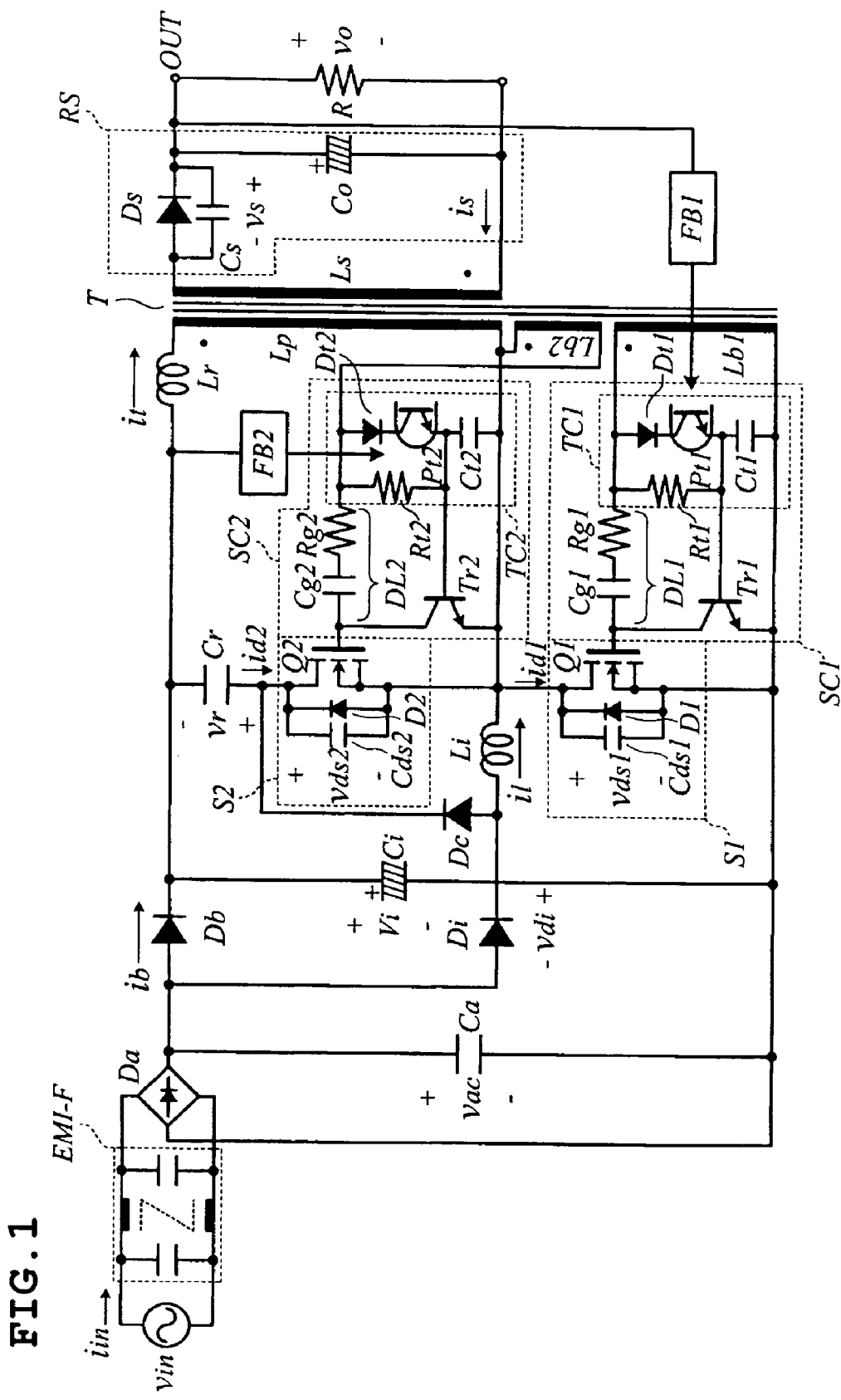
FIG. 1 is a circuit diagram of a switching power supply apparatus according to a first preferred embodiment of the present invention.

FIG. 1 is a circuit diagram of the switching power supply apparatus. In FIG. 1, symbol Vin denotes a commercial AC power supply. An input-side rectifying circuit Da includes a diode bridge, and full-wave rectifies the commercial AC power supply Vin via an EMI filter EMI-F. A first switch circuit S1 includes a first switch device Q1, a first diode D1, and a first capacitor Cds1. Likewise, a second switch circuit S2 includes a second switch device Q2, a second diode D2, and a second capacitor Cds2. The diodes D1 and D2 are parasitic diodes of the switch devices Q1 and Q2 serving as FETs, and the capacitors Cds1 and Cds2 are parasitic capacitors of the switch devices Q1 and Q2. However, the diodes D1 and D2 and the capacitors Cds1 and Cds2 may be additionally provided separately from the switch devices Q1 and Q2 to obtain necessary performance.

The rectified voltage of the input-side rectifying circuit Da is applied to a third capacitor Ca. A transformer T has a primary winding Lp, a secondary winding Ls, and drive windings Lb1 and Lb2. A rectifying and smoothing circuit RS including a rectifying diode Ds and a smoothing capacitor Co is connected to the secondary winding Ls of the transformer T. A capacitor Cs for resonance when the voltage of the transformer T is inverted is connected in parallel to the rectifying diode Ds. The capacitor Cs may use a parasitic capacitance of the rectifying diode Ds. A first inductor Lr and a second inductor Li are connected in series with the primary winding Lp of the transformer T. The inductor Lr may use a leakage inductance of the transformer T.

A fifth capacitor Cr is connected in series with the second switch circuit S2. The second switch circuit SC2, the fifth capacitor Cr, the first inductor Lr, and the primary winding Lp of the transformer T define a closed loop. One end of the second inductor Li is connected to a node between the first switch circuit S1 and the second switch circuit S2, and the other end is connected to a third diode Di. Both ends of a fifth diode Dc are connected to a node between the second switch circuit S2 and the fifth capacitor Cr and a node between the third diode Di and the second inductor Li.

A fourth capacitor Ci is connected between a node between the first switch circuit S1 and the third capacitor Ca and an end of the first inductor Lr.

Switching control circuits SC1 and SC2 are connected to the first and second switch circuits S1 and S2, respectively. A fourth diode Db is connected between the input-side rectifying circuit Da and the fourth capacitor Ci.

The switching control circuit SC1 includes a transistor Tr1 connected between a gate and source of the first switch device Q1, a delay circuit DL1, and a time constant circuit TC1. The delay circuit DL1 includes a series circuit having a capacitor Cg1 and a resistor Rg1, and an input capacitance (not shown) of the switch device Q1. The first switch device Q1 is turned on by an induction voltage of the drive winding Lb1. However, the turn-on timing of the switch device Q1 is delayed by the delay circuit DL1.

The time constant circuit TC1 includes an impedance circuit including a resistor Rt1, a diode Dt1, and a phototransistor Pt1 of a photocoupler, and a capacitor Ct1. The time constant circuit TC1 and the transistor Tr1 control the turn-off of the first switch device Q1.

The second switching control circuit SC2 has a similar structure to that of the first switching control circuit SC1, and operates in a similar manner.

A feedback circuit FB1 is connected to the phototransistor Pt1 of the photocoupler of the first switching control circuit SC1. The feedback circuit FB1 detects a voltage Vo to be output from the rectifying and smoothing circuit RS to an output terminal OUT, and performs feedback control so that the voltage Vo can be stabilized. A second feedback circuit FB2 detects an input voltage Vi of the fourth capacitor Ci, and performs feedback control to control the on-period of the second switch device Q2 so that the input voltage Vi does not increase over a predetermined value under a light load. However, the feedback circuit FB2 may be omitted if it is not necessary to control the voltage Vi of the capacitor Ci.

The third capacitor Ca causes a high-frequency current generated by switching the switch devices Q1 and Q2 to flow (or to be shunted) to a ground, and therefore blocks the high-frequency current from flowing back to the input power supply side. An inductor or the like may be inserted so that its inductance and the capacitance of the capacitor Ca define a low-pass filter.

The circuit operation of the switching power supply apparatus shown in FIG. 1 will be described with reference to FIGS. 2 and 3.

Figure 2:
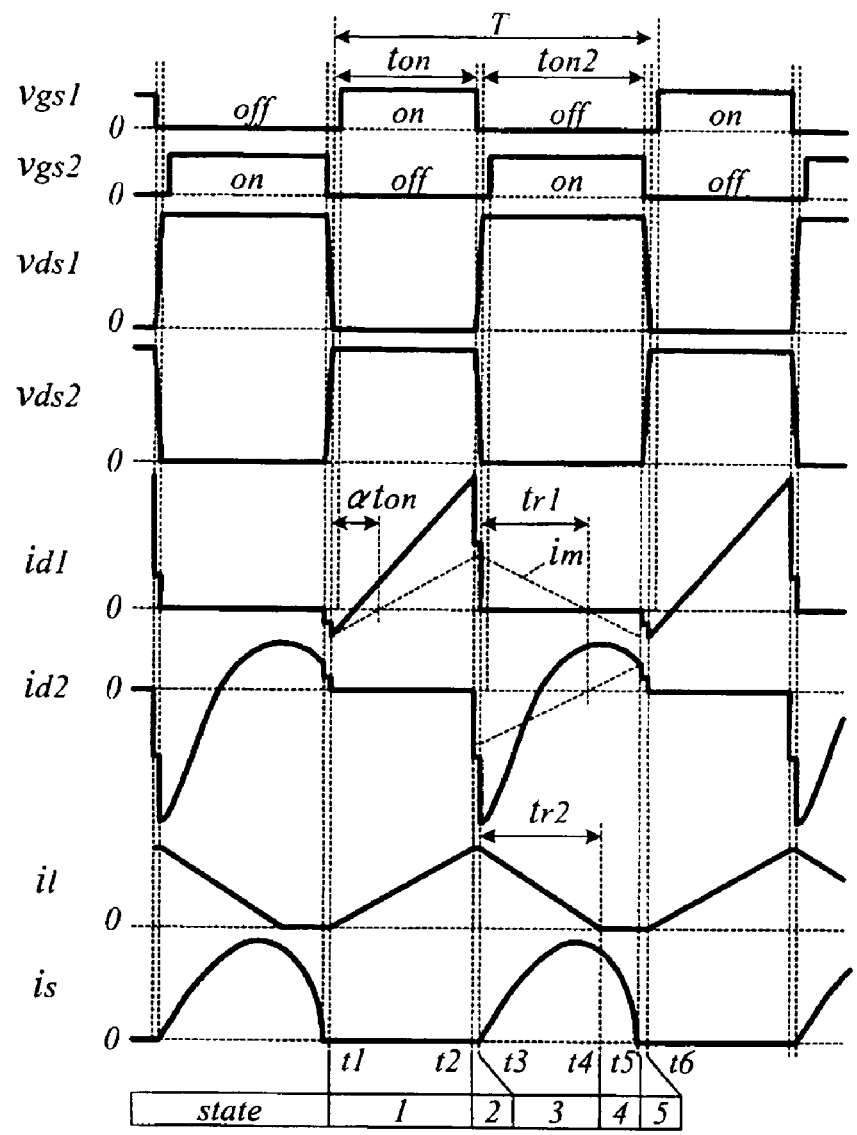
FIG. 2 is a waveform diagram of components in the switching power supply apparatus.
Figure 3:
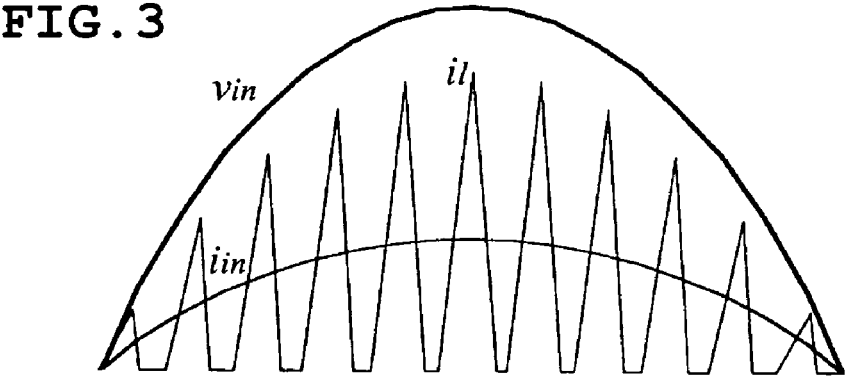
FIG. 3 is a waveform diagram of an input voltage, an input current, and a current flowing in an inductor.

FIG. 2 is a waveform diagram of the components shown in FIG. 1. FIG. 3 is a schematic waveform diagram of the input voltage Vin and an input current iin of the commercial power supply and a current i1 flowing in the inductor Li. The operation in various states is shown, wherein on/off signals (the gate-source voltages) of the switch devices Q1 and Q2 are indicated by "Vgs1" and "Vgs2", the drain-source voltages are indicated by "Vds1" and "Vds2", the drain currents are indicated by "id1" and "id2", the current of the rectifying diode Ds is indicated by "is", the current flowing in the inductor Li is indicated by "i1", and the excitation current of the transformer T is indicated by "im".

(1) State 1 [t1 to t2]

The diode D1 or the switch Q1 conducts, and the switch Q1 is turned on by the voltage of the drive winding Lb1 at the conduction time of the diode D1 to perform a ZVS operation. The primary winding Lp is supplied with the input voltage Vi and is excited, and the inductor Li is supplied with a full-wave rectified voltage Vac. In FIG. 2, αton denotes the time at which the excitation current im of the transformer T is negative during the on-period.

At time t2, the voltage of the capacitor Ct1 is equal to a threshold voltage of the transistor Tr1, and the transistor Tr1 is turned on while the switch Q1 is turned off. The voltage of the transformer T (the voltages of the windings of the transformer T) is inverted.

(2) State 2 [t2 to t3]

The current flowing in the primary winding Lp of the transformer T, the inductor Lr, and the inductor Li causes the capacitor Cds1 to be charged and the capacitor Cds2 to be discharged. At time t3, the voltage Vds2 becomes zero, and the diode D2 conducts. On the secondary side of the transformer T, the rectifying diode Ds conducts when the voltage Vs is zero.

(3) State 3 [t3 to t4]

At the conduction time of the diode D2, the switch Q2 is turned on by the voltage of the drive winding Lb2, and a ZVS operation is performed. On the primary side of the transformer T, the inductor Lr and the capacitor Cr resonate with each other, and the capacitor Ci is charged by the excitation current i1 stored in the inductor Li. On the secondary side of the transformer T, the excitation energy of the transformer T is released from the secondary winding Ls, and the current flowing in the diode Ds exhibits a curved waveform. In FIG. 2, tr1 represents the reset time of the transformer T. When the current i1 becomes zero at time t4 (tr2 elapsed since t3), the charging of the capacitor Ci is finished.

(4) State 4 [t4 to t5]

When the current i1 becomes zero, the diode Dc conducts, and both ends of the inductor Li together with the switch device Q2 are short-circuited, thereby clamping the applied voltage to the diode Di. In the state 3 and the state 4, a voltage Vr of the capacitor Cr is applied to a series circuit including the primary winding Lp and the inductor Lr, and the excitation current im decreases linearly. When the excitation current im becomes zero, the negative current flows, and excites the primary winding Lp in the direction opposite to that in the state 1. On the secondary side, the current flows until it becomes zero. At time t5, when the voltage of the capacitor Ct2 is equal to a threshold voltage of the transistor Tr2 and the transistor Tr2 is turned on, the switch Q2 is turned off.

(5) State 5 [t5 to t6]

On the secondary side of the transformer T, the reverse voltage is applied to the diode Ds, and the voltage of the secondary winding Ls of the transformer T is inverted. On the primary side, the current flowing in the primary winding Lp and the inductor Lr causes the capacitor Cds1 to be discharged and the capacitor Cds2 to be charged. At time t6, when the voltage Vds1 becomes zero, the diode D1 conducts.

The states 1 to 5 described above are repeated.

The circuit characteristics of the switching power supply apparatus shown in FIG. 1 are as follows.

Assuming that the period of time during which the switch device Q1 or the diode D1 conducts is indicated by "ton", the period of time during which the switch device Q2 or the diode D2 conducts is indicated by "ton2", one period is indicated by "T", the absolute value of the commercial power supply voltage (the rectified voltage of the commercial power supply) is indicated by "Vac", and the turns ratio of the primary winding Lp to the secondary winding Ls of the transformer T is indicated by "n", the equation below is satisfied for the product of the voltage applied to the transformer T:

$$Vi \times ton = nVo \times ton2 \qquad \text{Eq. (1)}$$

The equation below is satisfied for the product of the voltage applied to the inductor Li:

$$Vac \times ton = (Vi + nVo - Vac) \times tr2 \qquad \text{Eq. (2)}$$

In Eq. (2), tr2 denotes the time until the current i1 flowing in the inductor Li becomes zero in the off-period. The voltage Vi and the output voltage Vo are substantially constant during one period of the commercial power supply voltage. The output voltage can therefore be stabilized by controlling the time ton based on Eq. (1) to control ton/ton2 or the time ratio of ton/T.

Instantaneous input power p is given by the equation below from the general equation of a booster converter.

$$p = (Vac \cdot ton)^2 (Vi + nVo) / \{2LiT(Vi + nVo - Vac)\} \qquad \text{Eq. (3)}$$

Substituting Eq. (1) for Eq. (3) and rearranging, the following equation is found:

$$p = (Vac \cdot nVo)^2 / \{2LiVi(Vi + nVo - Vac)\} \times ton2 \qquad \text{Eq. (4)}$$

It can be seen that the input power p is proportional to the time ton2.

As can also be seen, if ton2 is constant in Eq. (4), the smaller the input power p is, the larger the voltage Vi becomes. It is therefore understood from Eq. (4) that the voltage Vi can be stabilized by controlling the time ton2.

When the time tr2 given by Eq. (2) is shorter than the time ton2, the peak current Ilp flowing in the inductor Li is given by the following equation:

$$Ilp = (Vac/Li) \times ton \qquad \text{Eq. (5)}$$

The on-period ton is substantially constant during one period of the commercial power supply voltage. Thus, the peak current Ilp is proportional to the full-wave rectified voltage Vac when ton2>tr2 is satisfied, and, as shown in FIG. 3, the input current iin of the commercial AC power supply exhibits substantially a sine wave. Therefore, the harmonic component of the input current is greatly reduced, and the power factor increases.

As can also be seen, since the on-period ton is substantially constant during one period of the commercial power supply voltage, the control circuit for stabilizing the output voltage has a better response characteristic, and the electrostatic energy stored in the capacitor Ci ensures a sufficient output voltage holding time.

The current i1 flowing in the inductor Li, which is a high-frequency switching current, flows through the capacitor Ca, and therefore does not flow in the input-side rectifying circuit Da. Thus, the power loss caused in the related art by the reverse recovery time, the reverse voltage, etc., which is produced by the rectifying device constituting the input-side rectifying circuit, can be greatly reduced.

The advantages of the switching power supply apparatus shown in FIG. 1 are as follows:

(1) The switch devices Q1 and Q2 have extremely low switching loss due to the ZVS operation.

(2) A switching current flows in the diode Di, and this switching current flows in the capacitor Ca. Thus, the switching current does not flow in the rectifying circuit Da, thereby reducing the loss. Although the diode Di must perform a high-speed operation corresponding to the switching frequency, the rectifying circuits Da and Db may be general diodes that perform a low-speed operation corresponding to the commercial power supply frequency.

(3) The inductor Li is short-circuited by the diode Dc and the switch device Q2 in a period of time during which the switch device Q1 is turned off. Thus, the current flowing in the inductor Li becomes zero, thereby preventing the voltage from being applied in the reverse direction. The voltage applied to the diode Di can therefore be greatly reduced.

(4) The output voltage Vo is controlled so as to be stabilized by controlling the on-period of the switch device Q1 based on a signal of the feedback circuit FB1.

(5) The input voltage Vi is controlled by controlling the on-period of the switch device Q2 based on a signal of the feedback circuit FB2. Thus, the input voltage Vi can be prevented from increasing under a light load or no load.

Next, a switching power supply apparatus according to a second preferred embodiment of the present invention will be described with reference to FIG. 4.

Figure 4:
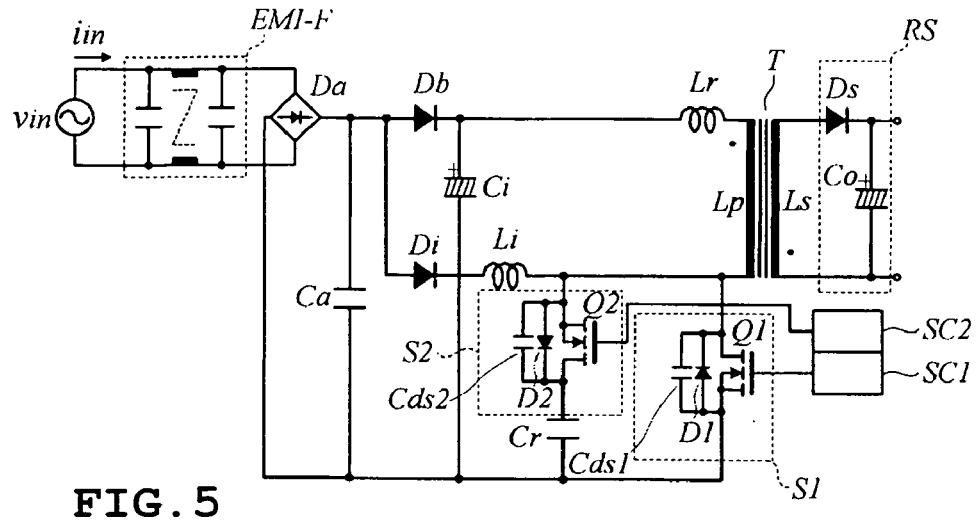
FIG. 4 is a circuit diagram of a switching power supply apparatus according to a second preferred embodiment of the present invention.

FIG. 4 is a circuit diagram thereof. In this example, unlike the switching power supply apparatus shown in FIG. 1, a series circuit including a second switch circuit S2 and a fifth capacitor Cr is connected in parallel to a first switch circuit S1. The remaining structure is similar to that shown in FIG. 1. In FIG. 4, the drive windings Lb1 and Lb2 of the transformer T and the feedback circuits FB1 and FB2 are not shown. The switching control circuits SC1 and SC2 are represented by blocks.

This circuit structure also achieves similar advantages to those of the first preferred embodiment. Although the voltage applied to the capacitor Cr is larger, the capacitor Cr can have a low capacitance if it is assumed that the amount of charge to be stored is fixed. Thus, the capacitor Cr can become compact.

Figure 5:
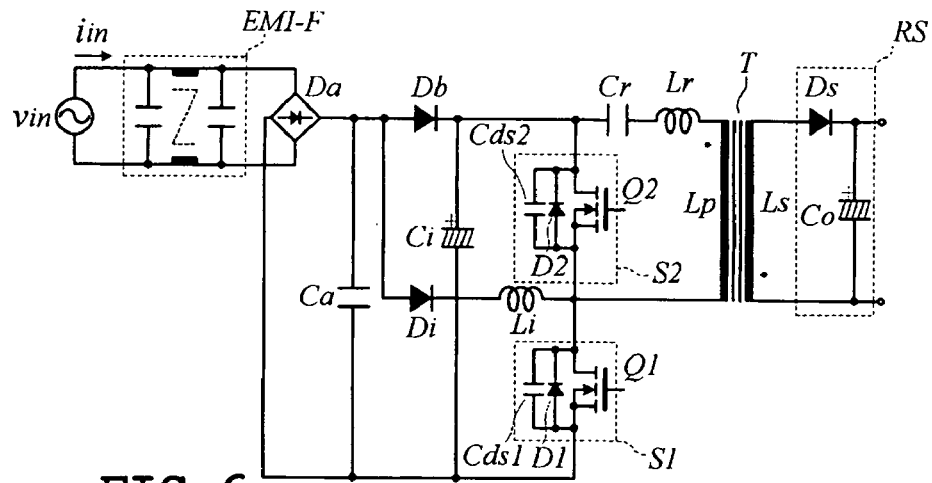
FIG. 5 is a circuit diagram of a switching power supply apparatus according to a third preferred embodiment of the present invention.

FIG. 5 is a circuit diagram of a switching power supply apparatus according to a third preferred embodiment of the present invention. In the example shown in FIG. 5, unlike the structure shown in FIG. 1, a fifth capacitor Cr is connected between one end of a fourth capacitor Ci and a first inductor Lr. Although not shown, the diode Dc shown in FIG. 1 may be connected between a cathode of a diode Di and a drain of a switch device Q2. The remaining structure is similar to that shown in FIG. 1. In FIG. 5, however, the drive windings Lb1 and Lb2 of the transformer T, the switching control circuits SC1 and SC2, and the feedback circuits FB1 and FB2 are not shown.

This structure also achieves similar advantages to those of the first preferred embodiment. Moreover, one end of the second switch device Q2 is connected to a node between the fifth capacitor Cr connected in series with the first inductor Lr and the fourth capacitor Ci. Thus, the voltage applied to the first and second switch devices Q1 and Q2 can be reduced, and the voltage stress thereon can be reduced.

Figure 6:
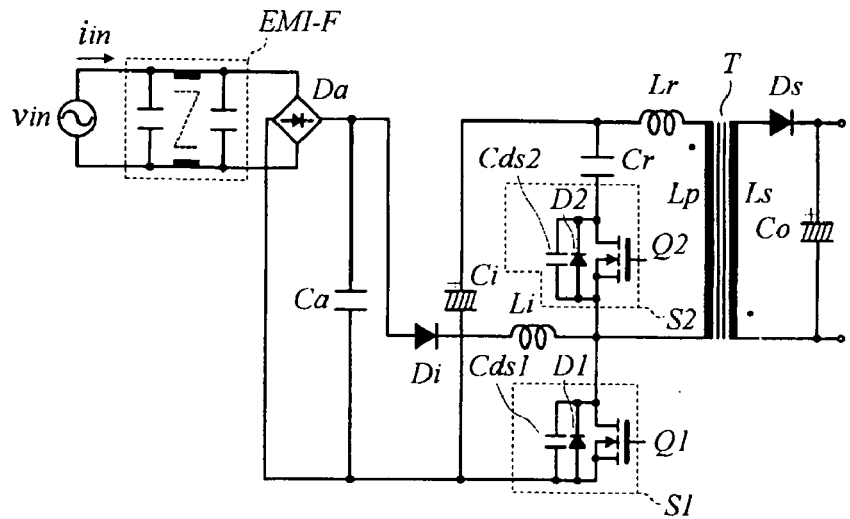
FIG. 6 is a circuit diagram of a switching power supply apparatus according to a fourth preferred embodiment of the present invention.

FIG. 6 is a circuit diagram of a switching power supply apparatus according to a fourth preferred embodiment of the present invention. In the example shown in FIG. 6, unlike the switching power supply apparatus shown in FIG. 1, the fourth diode Db shown in FIG. 1 is not provided. The fourth diode Db shown in FIG. 1 allows a charging current to be supplied to the fourth capacitor Ci. However, the diode Db and the capacitor Ci do not form a so-called capacitor-input rectifying and smoothing circuit. The capacitor Ci is charged by the primary winding Lp of the transformer T and the inductor Lr. Therefore, the diode Db shown in FIG. 1 is not essential. In the structure shown in FIG. 6, the diode Db is not necessary and therefore the number of parts can be reduced. When the switching power supply apparatus is powered on or under a heavy load, a current for charging the capacitor Ci flows through the transformer T in a state where the voltage across the capacitor Ci is smaller than the voltage across the capacitor Ca, and magnetic deviation of the transformer T may occur. By providing the diode Db shown in FIG. 1, the capacitor Ci can directly be charged when the apparatus is powered on or under a heavy load, and the problem described above is therefore overcome.

Figure 7:
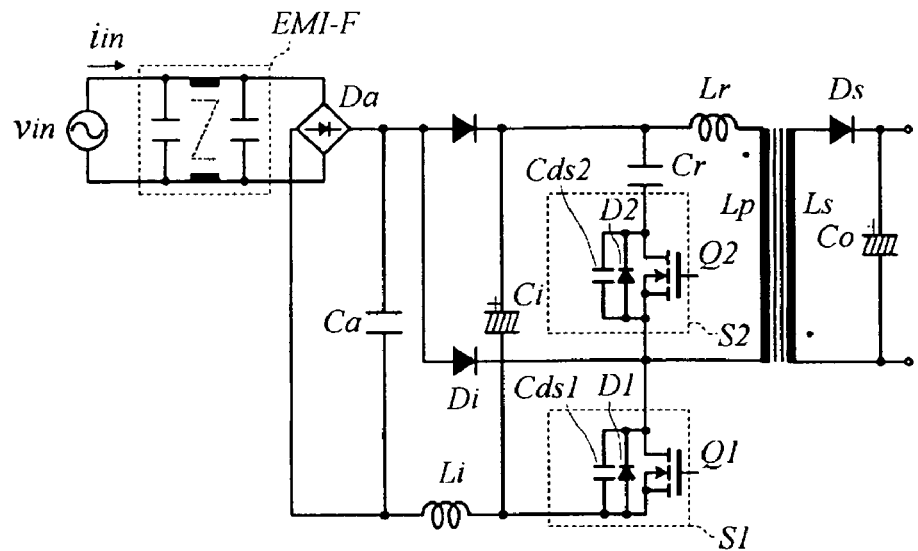
FIG. 7 is a circuit diagram of a switching power supply apparatus according to a fifth preferred embodiment of the present invention.

FIG. 7 is a circuit diagram of a switching power supply apparatus according to a fifth preferred embodiment of the present invention. In the example shown in FIG. 1, the second inductor Li is provided between the node between the first and second switch circuits S1 and S2 and the third diode Di, whereas, in the example shown in FIG. 7, a second inductor Li is provided between a node between a first switch circuit S1 and a capacitor Ci and a capacitor Ca. This structure also achieves similar advantages to those of the first preferred embodiment.

Figure 8:
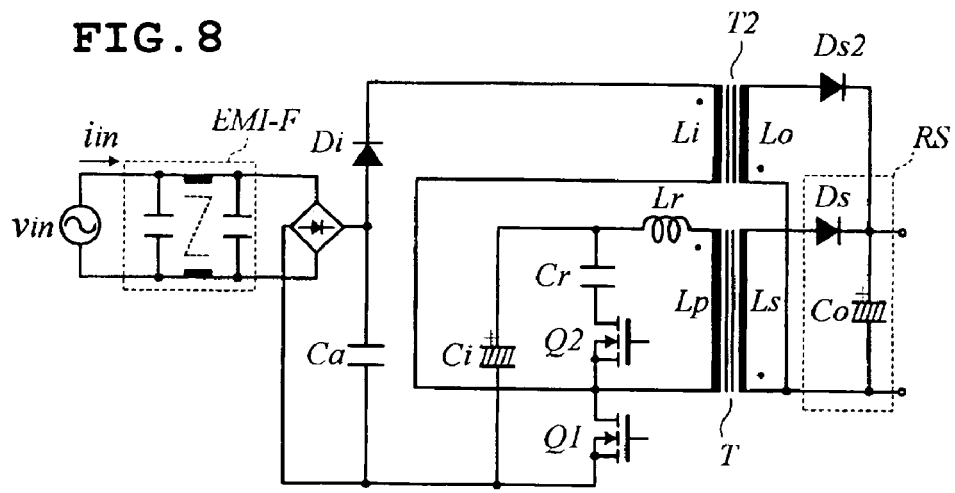
FIG. 8 is a circuit diagram of a switching power supply apparatus according to a sixth preferred embodiment of the present invention.

FIG. 8 is a circuit diagram of a switching power supply apparatus according to a sixth preferred embodiment of the present invention. In this example, a second transformer T2 is provided separately from a transformer T, and an input winding Li of the second transformer T2 is used as the second inductor Li shown in FIG. 1. A rectifying circuit Ds2 is provided between an output winding Lo of the second transformer T2 and a rectifying and smoothing circuit RS. The remaining portions are similar to those shown in FIG. 1. The component corresponding to the diode Db shown in FIG. 1 is not shown in FIG. 8.

This structure allows the energy stored in the inductor Li to be supplied from the output winding Lo of the transformer T2 to the side of the rectifying and smoothing circuit RS, thereby reducing the current of the transformer T. The conduction loss due to the windings of the transformer T, etc., can therefore be reduced, leading to higher efficiency. The rectifying circuit Ds2 and the rectifying circuit Ds may be separated and may be provided as different outputs.

Figure 9:
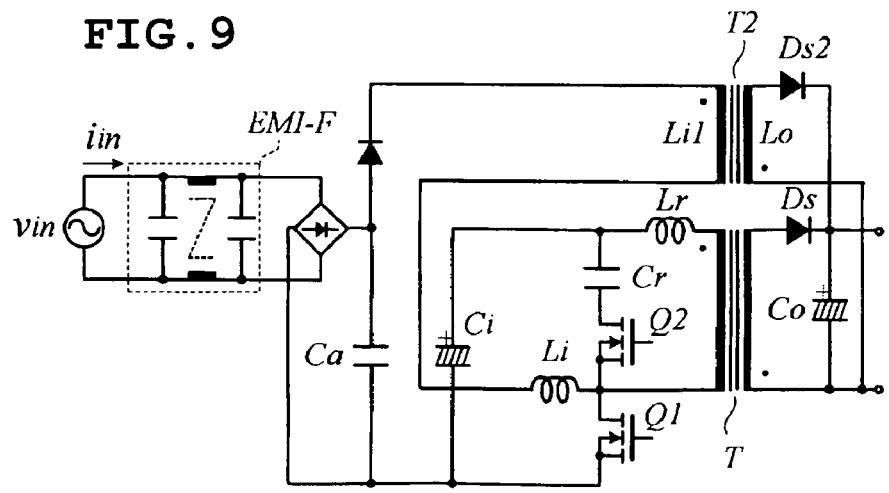
FIG. 9 is a circuit diagram of a switching power supply apparatus according to a seventh preferred embodiment of the present invention.

FIG. 9 is a circuit diagram of a switching power supply apparatus according to a seventh preferred embodiment of the present invention. In this example, a second transformer T2 is provided, and an inductor Li is provided in series with an input winding Li1 of the second transformer T2. The remaining portions are similar to those shown in FIG. 8.

This structure allows the energy stored in the inductor Li to be directly supplied to the side of the rectifying and smoothing circuit RS, thereby reducing the current of the transformer T. The conduction loss due to the windings of the transformer T, etc., can therefore be reduced, leading to high efficiency. Like the case shown in FIG. 8, the rectifying circuit Ds2 and the rectifying circuit Ds may be separated and may be provided as different outputs.

Figure 10:
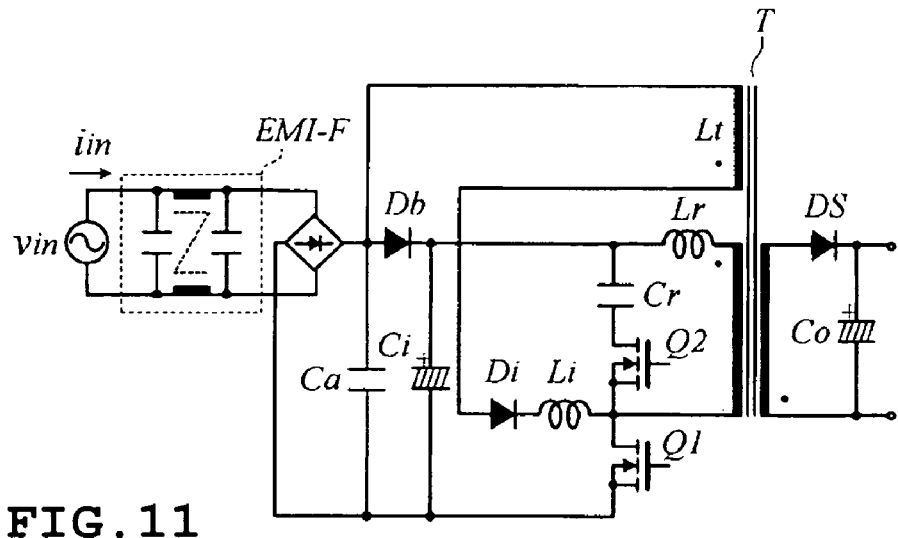
FIG. 10 is a circuit diagram of a switching power supply apparatus according to an eighth preferred embodiment of the present invention.

FIG. 10 is a circuit diagram of a switching power supply apparatus according to an eighth preferred embodiment of the present invention. In this example, the transformer T has a tertiary winding Lt, and the tertiary winding Lt is connected in series with a second inductor Li. The remaining structure is similar to that shown in FIG. 1.

The structure shown in FIG. 10 achieves similar advantages to those of the first preferred embodiment. Moreover, a voltage to be applied to the inductor Li can be adjusted using the voltage generated in the tertiary winding Lt of the transformer T, and the conduction angle of the input current iin (the conduction time during a half period of the commercial power supply voltage) can be adjusted to achieve both harmonic current suppression and loss reduction. By adjusting the turn ratio of the tertiary winding Lt and the primary winding, the conduction angle can be narrowed, thereby preventing an excessive voltage from being applied to the capacitor Ci.

Figure 11:
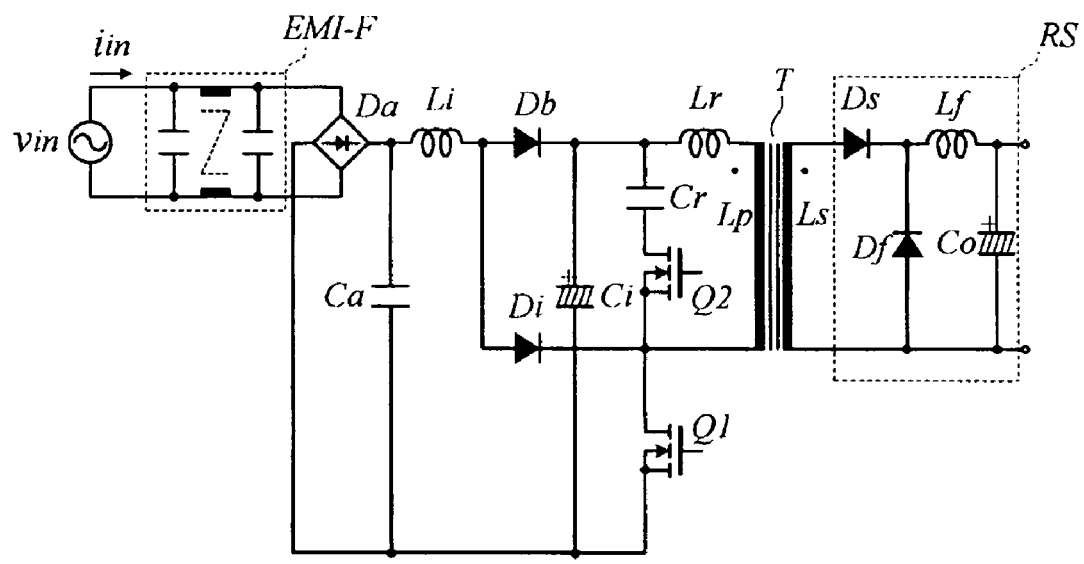
FIG. 11 is a circuit diagram of a switching power supply apparatus according to a ninth preferred embodiment of the present invention.

FIG. 11 is a circuit diagram of a switching power supply apparatus according to a ninth preferred embodiment of the present invention. In this example, an inductor Li is provided between a diode Db and a capacitor Ca. A rectifying and smoothing circuit RS is of the forward converter type additionally including a diode Df and an inductor Lf. The polarity of the secondary winding Ls of the transformer T is therefore opposite to that in the first to eighth preferred embodiments. The remaining structure is similar to that shown in FIG. 1. With the structure shown in FIG. 11, the excitation energy is stored in the inductor Lf, and the transformer T can therefore become more compact.

The secondary side may be of the flyback converter type shown in FIG. 1 without changing the position of the inductor Li. In FIGS. 1 and 4 to 10, the secondary side may be of the forward converter type, like FIG. 11.

Figure 12:
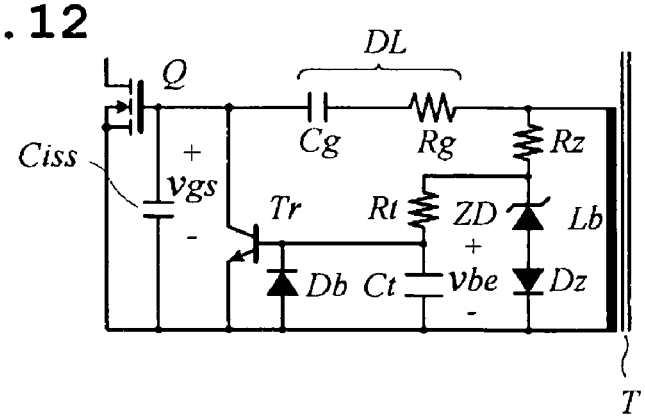
FIG. 12 is a diagram showing an example switching control circuit in a switching power supply apparatus according to a tenth preferred embodiment of the present invention.
Figure 13:
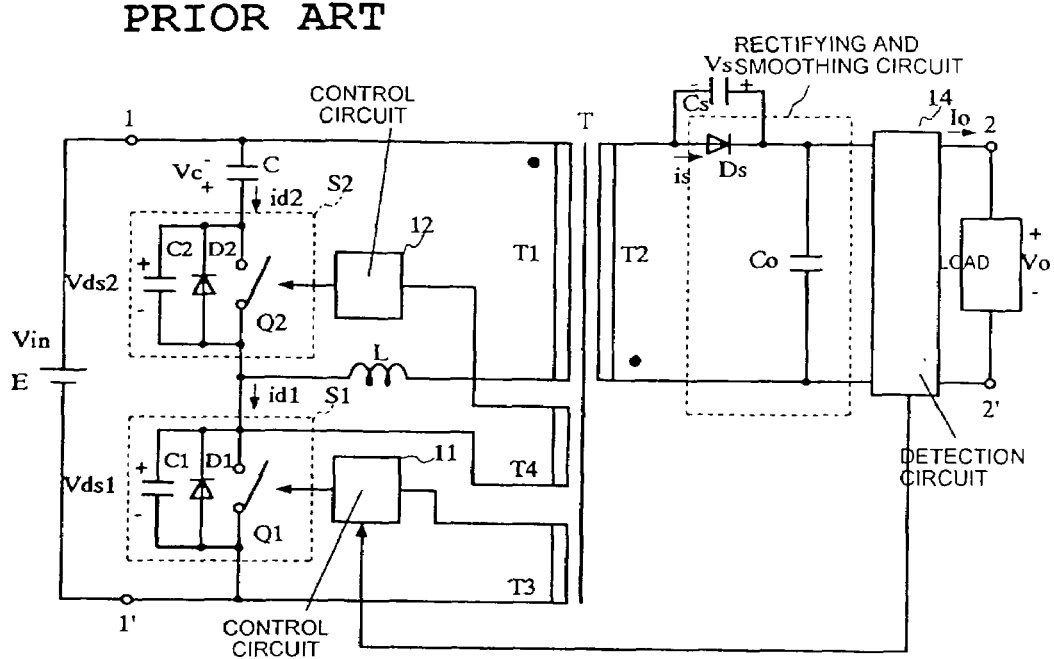
FIG. 13 is a circuit diagram of a switching power supply apparatus of the related art.
Figure 14:
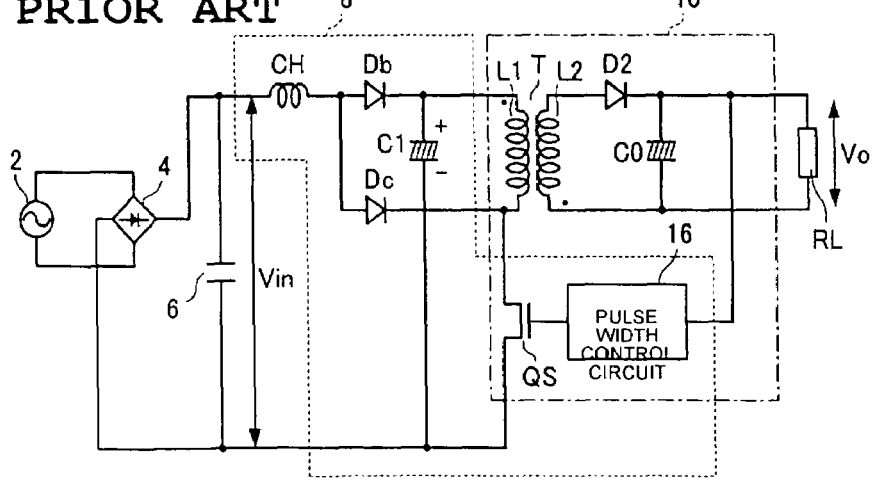
FIG. 14 is a circuit diagram of a switching power supply apparatus of the related art.
Figure 15:
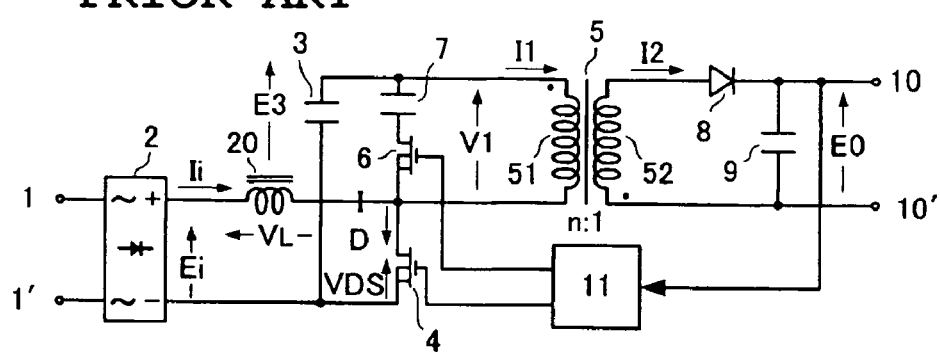
FIG. 15 is a circuit diagram of a switching power supply apparatus of the related art.

FIG. 12 shows an example structure of a switching control circuit in a switching power supply apparatus according to a tenth preferred embodiment of the present invention. In this example, a series circuit including a resistor Rz, a Zener diode ZD, and a diode Dz is connected to a drive winding Lb of a transformer T, and a series circuit including a resistor Rt and a capacitor Ct is connected in parallel to a series circuit including the Zener diode ZD and the diode Dz. A voltage of the capacitor Ct is applied to the base of a transistor Tr. A diode Db between the base and emitter of the transistor Tr prevents a reverse voltage from being applied between the base and emitter of the transistor Tr.

A series circuit including a resistor Rg and a capacitor Cg defines a delay circuit DL for delaying the turn-on of a switch device Q. A capacitor Ciss shows the input capacitance of the switch device Q.

A time constant circuit including the resistor Rt and the capacitor Ct is therefore supplied with a constant voltage by the Zener diode ZD, and is not affected by changes in the voltage of the drive winding Lb. By controlling the impedance of the resistor Rt, the turn-on timing of the transistor Tr, i.e., the on-period of the switch device Q, can be controlled.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

The invention claimed is:

1. A switching power supply apparatus comprising:
   a first switch circuit S1 including a parallel connection circuit having a first switch device Q1, a first diode D1, and a first capacitor Cds1;
   a second switch circuit S2 including a parallel connection circuit having a second switch device Q2, a second diode D2, and a second capacitor Cds2;
   an input-side rectifying circuit Da including at least one rectifying device for rectifying an AC input voltage;
   a third capacitor Ca to which the voltage rectified by the rectifying circuit Da is applied;
   a transformer T having a primary winding Lp and a secondary winding Ls;
   a rectifying and smoothing circuit RS connected to the secondary winding Ls;
   a first inductor Lr connected in series with the primary winding Lp;
   a second inductor Li connected so that a voltage of the third capacitor Ca is applied during an on-period for which the first switch circuit S1 conducts;
   a third diode Di preventing a reverse current from flowing in the second inductor Li;

a fourth capacitor Ci that is charged by excitation energy stored in the second inductor Li and that is connected so as to apply a voltage to the primary winding Lp during the on-period;
a fifth capacitor Cr defining a closed loop together with the first inductor Lr, the primary winding Lp, and the second switch circuit S2; and
switching control circuits SC1 and SC2 arranged to alternately turn on and off the first and second switch devices with a period of time during which both switch devices are turned off therebetween.

2. The switching power supply apparatus according to claim 1, wherein a second transformer T2 that is different from the transformer T is provided, the second inductor Li includes an input winding of the second transformer T2, and a rectifying circuit Ds2 is provided between an output winding Lo of the second transformer T2 and the rectifying and smoothing circuit RS.

3. The switching power supply apparatus according to claim 1, wherein a second transformer T2 that is different from the transformer T is provided, an input winding Li1 of the second transformer T2 is connected in series with the second inductor Li, and a rectifying circuit Ds2 is provided between an output winding Lo of the second transformer T2 and the rectifying and smoothing circuit RS.

4. The switching power supply apparatus according to claim 1, wherein the transformer T has a tertiary winding Lt, and the second inductor Li is connected in series with the tertiary winding Lt.

5. The switching power supply apparatus according to claim 1, wherein the third capacitor Ca is arranged to cause a harmonic component current to flow, and defines a low-pass filter or a portion of the low-pass filter.

6. The switching power supply apparatus according to claim 1, wherein a fourth diode Db is connected between the input-side rectifying circuit Da and the fourth capacitor Ci.

7. The switching power supply apparatus according to claim 1, wherein a first end of the second inductor Li is connected to a node between the first switch circuit S1 and the second switch circuit S2 and a second end of the second inductor Li is connected to the third diode Di, and both ends of the fourth diode Dc are connected to a node between the second switch circuit S2 and the fifth capacitor Cr and the node between the first switch circuit S1 and the second switch circuit S2.

8. The switching power supply apparatus according to claim 1, wherein the transformer T includes a plurality of drive windings Lb1 and Lb2, and the switching control circuits SC1 and SC2 drive the first switch device Q1 or the second switch device Q2 using a voltage generated in the drive windings Lb1 and Lb2.

9. The switching power supply apparatus according to claim 1, wherein delay circuits DL1 and DL2 including series circuits having resistors Rg1 and Rg2 and capacitors Cg1 and Cg2 are provided between the drive windings Lb1 and Lb2 and control terminals of the first and second switching devices Q1 and Q2, and the switching control circuits SC1 and SC2 turn on the switch devices Q1 and Q2 with a delay after voltages for turning on the switch devices Q1 and Q2 are generated in the drive windings Lb1 and Lb2, respectively.

10. The switching power supply apparatus according to claim 9, wherein delay times of the delay circuits DL1 and DL2 are set so that the switch devices Q1 and Q2 are not turned on until the voltages to be applied to both ends of the first and second switch devices Q1 and Q2 are reduced to zero or about zero.

11. The switching power supply apparatus according to claim 1, wherein the switching control circuits SC1 and SC2 include a switch device connected to control terminals of the switch devices Q1 and Q2, the switch device being turned on a predetermined time after voltages for turning on the switch devices Q1 and Q2 are generated in the drive windings Lb1 and Lb2, thereby turning off the switch devices Q1 and Q2.

12. The switching power supply apparatus according to claim 11, wherein the switch device includes transistors Tr1 and Tr2, and impedance circuits and capacitors Ct1 and Ct2 defining time constant circuits are connected to control terminals of the transistors Tr1 and Tr2, respectively.

13. The switching power supply apparatus according to claim 1, wherein the switching control circuits SC1 and SC2 include time constant circuits TC1 and TC2 for turning off the switch devices Q1 and Q2 a certain time after voltages for turning on the switch devices Q1 and Q2a are generated in the drive windings Lb1 and Lb2.

14. The switching power supply apparatus according to claim 1, wherein the transformer T has a leakage inductance, and the leakage inductance defines the first inductor Lr.

15. The switching power supply apparatus according to claim 1, wherein at least one of the first switch circuit S1 and the second switch circuit S2 includes a field-effect transistor.

16. The switching power supply apparatus according to claim 1, wherein the switching control circuits SC1 and SC2 control the on-period of the first switch device Q1 so as to stabilize an output voltage obtained from the rectifying and smoothing circuit RS connected to the secondary winding Ls.

17. The switching power supply apparatus according to claim 1, wherein the switching control circuits SC1 and SC2 control the on-period of the second switch device Q2 depending upon the voltage across the fourth capacitor Ci.

18. The switching power supply apparatus according to claim 1, wherein the switching control circuits SC1 and SC2 suppress the on-period of the second switch device Q2 as the voltage across the fourth capacitor Ci increases, and, transition to an intermittent oscillation operation mode in which an oscillation period and a stop period are periodically repeated under a light load or no load, the switching control circuits SC1 and SC2 suppress an increase of the voltage across the fourth capacitor Ci.

19. A switching power supply apparatus comprising:
a first switch circuit S1 including a parallel connection circuit having a first switch device Q1, a first diode D1, and a first capacitor Cds1;
a second switch circuit S2 including a parallel connection circuit having a second switch device Q2, a second diode D2, and a second capacitor Cds2;
an input-side rectifying circuit Da including at least one rectifying device for rectifying an AC input voltage;
a third capacitor Ca to which the voltage rectified by the rectifying circuit Da is applied;
a transformer T having a primary winding Lp and a secondary winding Ls;
a rectifying and smoothing circuit RS connected to the secondary winding Ls;
a first inductor Lr connected in series with the primary winding Lp;
a second inductor Li connected so that a voltage of the third capacitor Ca is applied during an on-period for which the first switch circuit S1 conducts;
a third diode Di preventing a reverse current from flowing in the second inductor Li;

a fourth capacitor Ci that is charged by excitation energy stored in the second inductor Li and that is connected so as to apply a voltage to the primary winding Lp during the on-period;

a fifth capacitor Cr defining, together with the second switch circuit S2, a series circuit connected to both ends of the first switch circuit S1; and switching control circuits SC1 and SC2 arranged to alternately turn on and off the first and second switch devices with a period of time during which both switch devices are turned off therebetween.

20. The switching power supply apparatus according to claim 19, wherein a second transformer T2 that is different from the transformer T is provided, the second inductor Li includes an input winding of the second transformer T2, and a rectifying circuit Ds2 is provided between an output winding Lo of the second transformer T2 and the rectifying and smoothing circuit RS.

21. The switching power supply apparatus according to claim 19, wherein a second transformer T2 that is different from the transformer T is provided, an input winding Li1 of the second transformer T2 is connected in series with the second inductor Li, and a rectifying circuit Ds2 is provided between an output winding Lo of the second transformer T2 and the rectifying and smoothing circuit RS.

22. The switching power supply apparatus according to claim 19, wherein the transformer T has a tertiary winding Lt, and the second inductor Li is connected in series with the tertiary winding Lt.

23. The switching power supply apparatus according to claim 19, wherein the third capacitor Ca is arranged to cause a harmonic component current to flow, and defines a low-pass filter or a portion of the low-pass filter.

24. The switching power supply apparatus according to claim 19, wherein a fourth diode Db is connected between the input-side rectifying circuit Da and the fourth capacitor Ci.

25. The switching power supply apparatus according to claim 19, wherein a first end of the second inductor Li is connected to a node between the first switch circuit S1 and the second switch circuit S2 and a second end of the second inductor Li is connected to the third diode Di, and both ends of the fourth diode Dc are connected to a node between the second switch circuit S2 and the fifth capacitor Cr and the node between the first switch circuit S1 and the second switch circuit S2.

26. The switching power supply apparatus according to claim 19, wherein the transformer T includes a plurality of drive windings Lb1 and Lb2, and the switching control circuits SC1 and SC2 drive the first switch device Q1 or the second switch device Q2 using a voltage generated in the drive windings Lb1 and Lb2.

27. The switching power supply apparatus according to claim 19, wherein delay circuits DL1 and DL2 including series circuits having resistors Rg1 and Rg2 and capacitors Cg1 and Cg2 are provided between the drive windings Lb1 and Lb2 and control terminals of the first and second switching devices Q1 and Q2, and the switching control circuits SC1 and SC2 turn on the switch devices Q1 and Q2 with a delay after voltages for turning on the switch devices Q1 and Q2 are generated in the drive windings Lb1 and Lb2, respectively.

28. The switching power supply apparatus according to claim 27, wherein delay times of the delay circuits DL1 and DL2 are set so that the switch devices Q1 and Q2 are not turned on until the voltages to be applied to both ends of the first and second switch devices Q1 and Q2 are reduced to zero or about zero.

29. The switching power supply apparatus according to claim 19, wherein the switching control circuits SC1 and SC2 include a switch device connected to control terminals of the switch devices Q1 and Q2, the switch device being turned on a predetermined time after voltages for turning on the switch devices Q1 and Q2 are generated in the drive windings Lb1 and Lb2, thereby turning off the switch devices Q1 and Q2.

30. The switching power supply apparatus according to claim 29, wherein the switch device includes transistors Tr1 and Tr2, and impedance circuits and capacitors Ct1 and Ct2 defining time constant circuits are connected to control terminals of the transistors Tr1 and Tr2, respectively.

31. The switching power supply apparatus according to claim 19, wherein the switching control circuits SC1 and SC2 include time constant circuits TC1 and TC2 for turning off the switch devices Q1 and Q2 a certain time after voltages for turning on the switch devices Q1 and Q2a are generated in the drive windings Lb1 and Lb2.

32. The switching power supply apparatus according to claim 19, wherein the transformer T has a leakage inductance, and the leakage inductance defines the first inductor Lr.

33. The switching power supply apparatus according to claim 19, wherein at least one of the first switch circuit S1 and the second switch circuit S2 includes a field-effect transistor.

34. The switching power supply apparatus according to claim 19, wherein the switching control circuits SC1 and SC2 control the on-period of the first switch device Q1 so as to stabilize an output voltage obtained from the rectifying and smoothing circuit RS connected to the secondary winding Ls.

35. The switching power supply apparatus according to claim 19, wherein the switching control circuits SC1 and SC2 control the on-period of the second switch device Q2 depending upon the voltage across the fourth capacitor Ci.

36. The switching power supply apparatus according to claim 19, wherein the switching control circuits SC1 and SC2 suppress the on-period of the second switch device Q2 as the voltage across the fourth capacitor Ci increases, and, transition to an intermittent oscillation operation mode in which an oscillation period and a stop period are periodically repeated under a light load or no load, the switching control circuits SC1 and SC2 suppress an increase of the voltage across the fourth capacitor Ci.

* * * * *